United States Patent
Wu

(10) Patent No.: US 8,602,007 B2
(45) Date of Patent: Dec. 10, 2013

(54) INTEGRATED EXHAUST GAS RECIRCULATION AND CHARGE COOLING SYSTEM

(75) Inventor: Ko-Jen Wu, Troy, MI (US)

(73) Assignee: Gm Global Technology Operations LLC, Detroit, MI (US)

( * ) Notice: Subject to any disclaimer, the term of this patent is extended or adjusted under 35 U.S.C. 154(b) by 507 days.

(21) Appl. No.: 12/884,686

(22) Filed: Sep. 17, 2010

(65) Prior Publication Data
US 2012/0067330 A1 Mar. 22, 2012

(51) Int. Cl.
*F02M 25/07* (2006.01)
*F02M 25/00* (2006.01)

(52) U.S. Cl.
USPC ..................................... 123/568.12; 701/108

(58) Field of Classification Search
USPC .............. 123/568.12, 559.1, 41.51, 542, 563, 123/540; 701/108; 60/320, 605.1, 605.2, 60/278
See application file for complete search history.

(56) References Cited

U.S. PATENT DOCUMENTS

| 6,899,090 B2 * | 5/2005 | Arnold ..................... 123/568.12 |
| 2008/0135028 A1 * | 6/2008 | Kardos et al. ............ 123/568.12 |
| 2009/0132153 A1 * | 5/2009 | Shutty et al. .................. 701/108 |
| 2011/0041814 A1 * | 2/2011 | Kardos et al. ................. 123/563 |
| 2011/0083648 A1 * | 4/2011 | Cattani et al. ............ 123/568.12 |

FOREIGN PATENT DOCUMENTS

| CN | 101331302 A | 12/2008 |
| GB | 2444948 A * | 6/2008 |

OTHER PUBLICATIONS

Office Action regarding corresponding CN Application No. 201110334757.0, dated Sep. 12, 2013, 7 pgs.

* cited by examiner

*Primary Examiner* — Mahmoud Gimie
(74) *Attorney, Agent, or Firm* — Cantor Colburn LLP

(57) ABSTRACT

An intake system for an internal combustion engine comprises an exhaust driven turbocharger configured to deliver compressed intake charge, comprising exhaust gas from the exhaust system and ambient air, through an intake charge conduit and to cylinders of the internal combustion engine. An intake charge cooler is in fluid communication with the intake charge conduit. A cooling system, independent of the cooling system for the internal combustion engine, is in fluid communication with the intake charge cooler through a cooling system conduit. A coolant pump delivers a low temperature cooling medium from the cooling system to and through the intake charge cooler for the transfer of heat from the compressed intake charge thereto. A low temperature cooler receives the heated cooling medium through the cooling system conduit for the transfer of heat therefrom.

16 Claims, 4 Drawing Sheets

INTEGRATED EXHAUST GAS RECIRCULATION AND CHARGE COOLING SYSTEM

FEDERAL RESEARCH STATEMENT

This invention was made with Government support under Agreement No. DE-FC26-07NT43271, awarded by the Department of Energy. The Government has certain rights in the invention.

FIELD OF THE INVENTION

Exemplary embodiments of the present invention relate to a recirculated exhaust gas and compressed intake charge cooling system and, more particularly, to an integrated system for cooling both the recirculated exhaust gas charge and the compressed intake charge.

BACKGROUND

Recirculated exhaust gas ("EGR") is an important element for both diesel and gasoline engines, particularly engines utilizing intake charge boosting (ex. exhaust driven turbocharger or engine driven supercharger) for both fuel consumption improvements and for reduction in regulated tailpipe exhaust gas emissions.

Typically, the cooling of EGR has been achieved separately from the cooling of the compressed intake charge due to the substantial temperature differential between that of the exhaust gas and the compressed intake charge. EGR is often cooled through a gas-to-liquid charge cooler that utilizes coolant from the engines primary cooling system as the cooling medium. As a result, however, in an engine that has reached normal operating temperatures, the minimum temperature of the EGR may be limited by the temperature of the engine coolant (the typical temperature coolant range may be 90 to 110 degrees C. as set by a thermostat) in the primary cooling system. The cooling of the compressed intake charge is typically achieved through a gas-to-liquid, or more likely a gas-to gas (ex. ambient air) type of heat exchanger. Gas-to gas compressed intake charge cooling is more often found in today's engine applications. However, the utilization of a gas-to-liquid compressed intake charge cooler has the advantage of improved system transient response and has been receiving increased attention as downsized, boosted internal combustion engines are considered as a key solution to improving fuel economy and engine-out emissions.

SUMMARY OF THE INVENTION

In an exemplary embodiment of the present invention, an intake system for an internal combustion engine having a primary cooling system, the intake system comprising an intake charge compressor configured to deliver a compressed intake charge, comprising exhaust gas from the exhaust system and ambient air, through an intake charge conduit and to the internal combustion engine. An intake charge cooler is in fluid communication with the intake charge conduit and is configured to receive and transit the compressed intake charge therethrough. A secondary cooling system, independent of the primary cooling system for the internal combustion engine, is in fluid communication with the intake charge cooler through a cooling system conduit. A low temperature cooler, in communication with the low temperature cooling medium, is configured to receive the cooling medium through the secondary cooling system conduit for the transfer of heat therefrom.

In another exemplary embodiment, an intake system for an internal combustion engine having a primary cooling system, the intake system comprising an intake charge compressor configured to deliver a compressed intake charge, comprising exhaust gas from the exhaust system and ambient air, through an intake charge conduit and to the internal combustion engine. An exhaust gas recirculation conduit extends between the exhaust system of the internal combustion engine and an intake of the intake charge compressor for delivery of recirculated exhaust gas thereto. An exhaust gas recirculation valve is disposed in the exhaust gas recirculation conduit and is configured to regulate the flow of exhaust gas to the exhaust driven turbocharger. An exhaust gas cooler is in fluid communication with the exhaust gas conduit and is configured to receive and transit the exhaust gas therethrough. An intake charge cooler is in fluid communication with the intake charge conduit and is configured to receive and transit the compressed intake charge therethrough. A secondary cooling system, independent of the primary cooling system for the internal combustion engine, is in fluid communication with the intake charge cooler and the exhaust gas cooler through a cooling system conduit. A low temperature cooler, in communication with the low temperature cooling medium, is configured to receive the cooling medium through the cooling system conduit.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
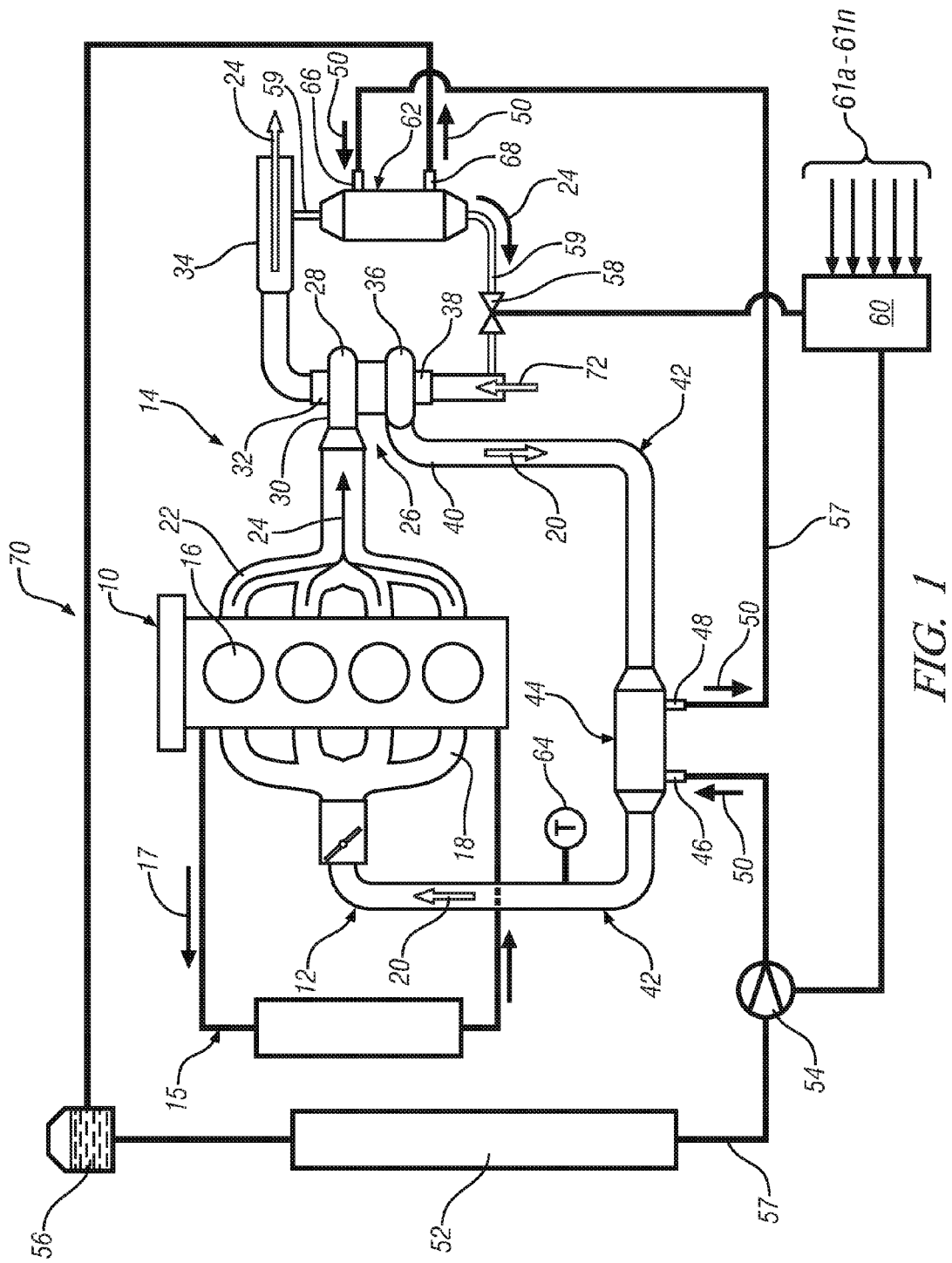
FIG. 1 is a schematic view of an internal combustion engine system comprising an exhaust gas recirculation cooling system and a compressed intake charge cooling system embodying features of the present invention.

The following description is merely exemplary in nature and is not intended to limit the present disclosure, application or uses. It should be understood that throughout the drawings, corresponding reference numerals indicate like or corresponding parts and features.

Referring to FIG. 1, an exemplary embodiment is directed to an internal combustion engine 10, in this case an in-line 4 cylinder engine, including an intake system 12 and an exhaust system 14 and a primary cooling system 15 that circulates engine coolant 17 through the engine to remove excess heat. The internal combustion engine includes a plurality of cylinders 16 into which a combination of combustion air and fuel are introduced. The combustion air/fuel mixture is combusted resulting in reciprocation of pistons (not shown) therein. The reciprocation of the pistons rotates a crankshaft (not shown) to deliver motive power to a vehicle powertrain (not shown) or to a generator or other stationary recipient of such power (not shown) in various applications of the internal combustion engine 10.

The internal combustion engine 10 includes an intake manifold 18, in fluid communication with the cylinders 16 that receives a compressed intake charge from a compressor in the intake system 12 and delivers the charge to the plurality of cylinders 16. The exhaust system 14 includes an exhaust manifold 22, also in fluid communication with the cylinders 16, which is configured to remove combusted constituents of the combustion air and fuel (i.e. exhaust gas 24) and to deliver it to an exhaust driven turbocharger 26 that is located in fluid communication therewith. The exhaust driven turbocharger 26 includes an exhaust gas turbine (not shown) that is housed within a turbine housing 28. The turbine housing includes an inlet 30 and an outlet 32. The outlet 32 is in fluid communication with the remainder of the exhaust system 14 and delivers the exhaust gas 24 to an exhaust gas conduit 34 for delivery to various exhaust aftertreatment devices (not shown) that are configured to treat various regulated constituents of the exhaust gas 24 prior to its release to the atmosphere.

The exhaust driven turbocharger 26 also includes an intake charge compressor wheel (not shown) that is housed within a compressor housing 36. The compressor housing 36 includes an inlet 38 and an outlet 40. The outlet 40 is in fluid communication with the intake system 12 and delivers a compressed intake charge 20 through an intake charge conduit 42 to the intake manifold 18 for delivery to the cylinders 16 of the internal combustion engine 10 for mixing with fuel and for combustion therein. In an exemplary embodiment, disposed inline between the compressor housing outlet 40 and the intake manifold 18 is a compressed intake charge cooler 44. The compressed intake charge cooler 44 receives heated (due to compression) compressed intake charge 20 from the intake charge conduit 42 and, following cooling of the compressed intake charge 20 therein, delivers it to the intake manifold 18 through a subsequent portion of the intake charge conduit 42. The intake charge cooler 44 comprises an inlet 46 and an outlet 48 for the circulation of a cooling medium 50 (such as a typical glycol-based automotive coolant, or other suitable medium for effective heat transfer in a heat exchanger) supplied through a secondary cooling system 70. In a known manner, the intake charge cooler 44 transfers heat from the compressed intake charge 20 to the cooling medium 50 to thereby reduce the temperature of the compressed intake charge 20 as it transits the intake charge cooler 44. The intake charge cooler inlet 46 receives low temperature coolant medium 50, from the secondary cooling system 70, having a significantly lower temperature than engine coolant 17 from the primary cooling system 15 of the internal combustion engine 10. The low temperature coolant medium 50 is supplied through a cooling system conduit 57 that is in fluid communication with a low temperature cooler or radiator 52 of the secondary cooling system 70. The low temperature coolant 50 is under pressure from a cooling medium pump 54. The low temperature cooler 52 is supplied by a cooling medium reservoir 56 in order to maintain a sufficient supply of coolant medium 50 circulating throughout the secondary cooling system 70 during operation of the internal combustion engine 10.

Located in fluid communication with the exhaust system 14, and in the exemplary embodiment shown in FIG. 1, is an exhaust gas recirculation ("EGR") conduit 59. The EGR conduit 59, in the embodiment shown, is located downstream of the turbine housing outlet 32, in communication with the exhaust gas conduit 34. The EGR conduit 59 is configured to extend between and to divert a portion of the exhaust gas 24 from the exhaust gas conduit 34 and to return it to, or recirculate it to, the intake system 12 through the compressor housing inlet 38 of the exhaust driven turbocharger 26. An EGR valve 58 that is in signal communication with a control module such as engine controller 60 adjusts the volumetric quantity of exhaust gas 24 that is diverted to the intake system 12, based on the particular engine operating conditions at any given time. The engine controller 60 collects information regarding the operation of the internal combustion engine 10 from sensors $61a$-$61n$, such as temperature (intake system, exhaust system, engine coolant, ambient, etc.), pressure, exhaust system conditions, driver demand as well as the temperature of the compressed intake charge supplied by temperature sensor 64 and, as a result, may adjust the flow of exhaust gas 24 through the EGR valve 58 and into the compressed intake charge 20. As a result the compressed intake charge 20 may comprise a continuously variable combination of fresh air 72 and recirculated exhaust gas 24, depending on the commanded quantity of EGR by the controller 60.

Disposed inline of the EGR conduit 59, upstream of the compressor housing inlet 38 is an exhaust gas cooler 62. The exhaust gas cooler 62 receives hot exhaust gas 24 from the EGR conduit 59 and, following cooling of the exhaust gas 24 therein, delivers the cooled, exhaust gas 24 through the EGR conduit 59 to the compressor housing inlet 38. The exhaust gas cooler 62 comprises an inlet 66 and an outlet 68 for the circulation of cooling medium 50 therethrough. In a known manner, the exhaust gas cooler 62 transfers heat from the exhaust gas 24 to the cooling medium 50 to thereby reduce the temperature of the exhaust gas 24 as it transits the cooler 62.

In an exemplary embodiment, the intake charge cooler outlet 48 is in fluid communication with the coolant inlet 66 for transfer of the cooling medium 50 from the intake charge cooler 44 to the exhaust gas cooler 62. After passing through the exhaust gas cooler 62 the cooling medium 50 exits the exhaust gas cooler through the outlet 68 and is returned to the coolant reservoir 56 and/or the low temperature cooler or radiator 52 for the removal of heat before being recirculated through the cooling system 70. In addition, depending on various operating conditions, the controller may also adjust the operation of the cooling medium pump 54 such that the flow of cooling medium 50 is varied through the cooling system 70 to thereby adjust the degree of cooling that the recirculated exhaust gas 24 and compressed intake charge 20 will experience prior to delivery to the intake manifold 18 of the internal combustion engine 10.

The use of a cooling system 70 and coolant medium 50 that is separate and independent from the primary cooling system 15 of the internal combustion engine 10 allows a significant increase in the capacity to cool the recirculated exhaust gas 24 prior to its introduction into the compressor intake 38 of the exhaust driven turbocharger 26 as well as to cool the overall compressed intake charge 20 prior to its introduction into the intake manifold 18 of the internal combustion engine 10 due to the significantly larger temperature differential that may be realized between the EGR gas temperature of around 650 degrees C. at the EGR conduit 59 to 25 to 130 degrees C. at the EGR cooler outlet. Such cooling efficiency helps to increase the density of the compressed intake charge 20 which boosts the power efficiency of the engine. Adding larger and cooler quantities of EGR reduces the temperature of the combustion event extracting more work from the pistons and resulting in less waste heat/energy that must be removed by the primary cooling system 15 of the engine 10.

Figure 2:
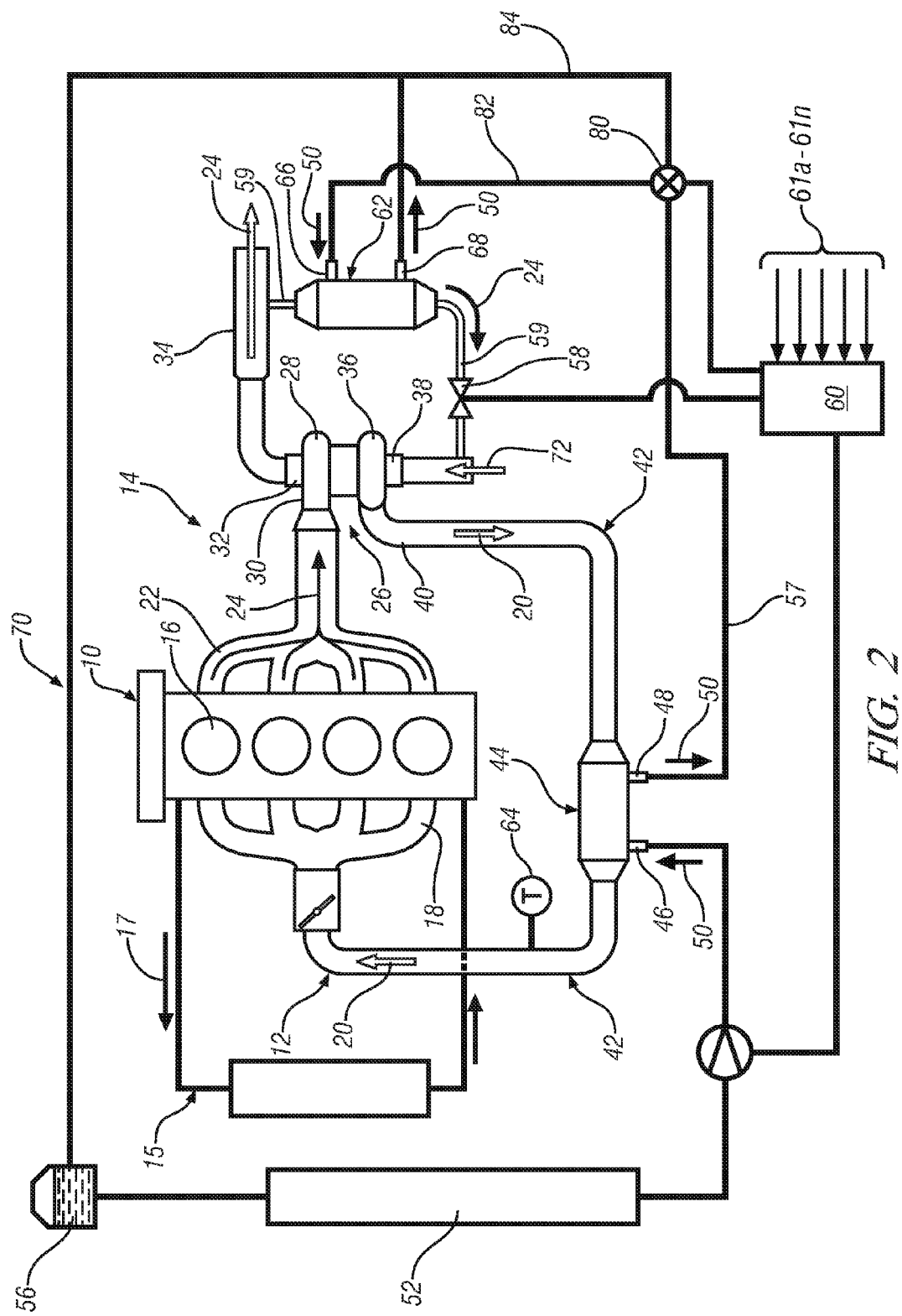
FIG. 2 is a schematic view of an internal combustion engine system comprising another embodiment the exhaust gas recirculation cooling system and the compressed intake charge cooling system of FIG. 1, embodying features of the present invention.

Referring now to FIG. 2, in another exemplary embodiment, a valve member 80 separates an exhaust gas cooling medium conduit branch 82, extending between cooling system conduit 57 and the exhaust gas coolant inlet 66. The valve member 80 is in signal communication with the engine controller 60 and, during certain predetermined operating conditions, the valve member 80 may be adjusted to allow cooling medium 50 to flow to the exhaust gas cooler 62 as described herein or, the valve member 80 may be alternately adjusted by the controller 60 to direct the flow of cooling medium 50 through bypass portion 84 of the cooling system conduit 57 and back to the cooling reservoir 56 or low temperature cooler 52. In this embodiment, the controller 60 has the option to vary the cooling of the exhaust gas 24 that is diverted to the compressor housing inlet 38 of the exhaust driven turbocharger 26 by the EGR valve 58.

Figure 3:
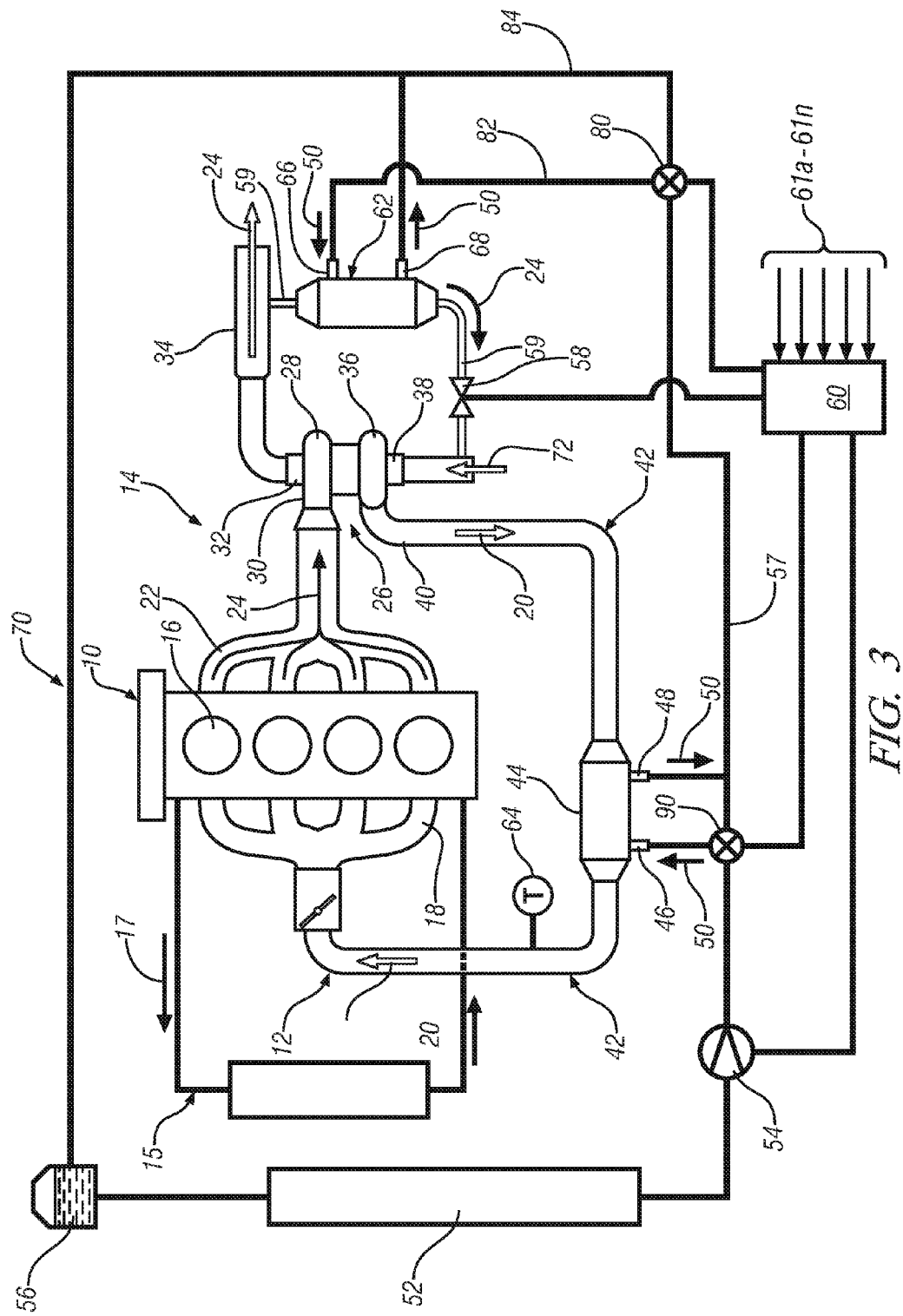
FIG. 3 is a schematic view of an internal combustion engine system comprising yet another embodiment the exhaust gas recirculation cooling system and the compressed intake charge cooling system of FIG. 1, embodying features of the present invention.

Referring now to FIG. 3, in yet another embodiment, the cooling system 70 further includes a second valve member 90 that is disposed between the cooling system conduit 57 and the intake charge cooler 44 (ex. between the conduit 57 and the intake charge cooler inlet 46). The second valve member 90 is in signal communication with the engine controller 60 and, during certain predetermined operating conditions, the valve member 90 may be adjusted to allow cooling medium 50 to flow to the intake charge cooler as described herein or, the valve member 90 may be alternately adjusted by the controller 60 to direct the flow of cooling medium 50 past the intake charge cooler 44 and through conduit 57 to the cooling reservoir 56 or low temperature cooler 52. In addition, in an exemplary embodiment, a valve member 80 separates an exhaust gas cooling medium conduit branch 82, which extends between cooling system conduit 57 and the exhaust gas coolant inlet 66. The valve member 80 is in signal communication with the engine controller 60 and, during certain predetermined operating conditions, the valve member 80 may be adjusted to allow cooling medium 50 to flow to the exhaust gas cooler 62 as described herein or, the valve member 80 may be alternately adjusted by the controller 60 to direct the flow of cooling medium 50 through bypass portion 84 of the cooling system conduit 57 and back to the cooling reservoir 56 or low temperature cooler 52. In this embodiment, the controller has the option to vary the cooling of the exhaust gas 24 that is delivered to the compressor housing inlet 38 of the exhaust driven turbocharger 26 by the EGR valve 58 as well as to vary the cooling of the compressed intake charge 20 as it transits the intake charge cooler 44, or a combination of both. It is contemplated in the embodiments described thus far that the valve members 80 and 90 may be 3-way valves that are fully on or off, or they may be variable valves that afford the controller 60 even greater resolution with respect to the flow of low temperature cooling medium 50 through the exhaust gas cooler 62 and the intake charge cooler 44.

Figure 4:
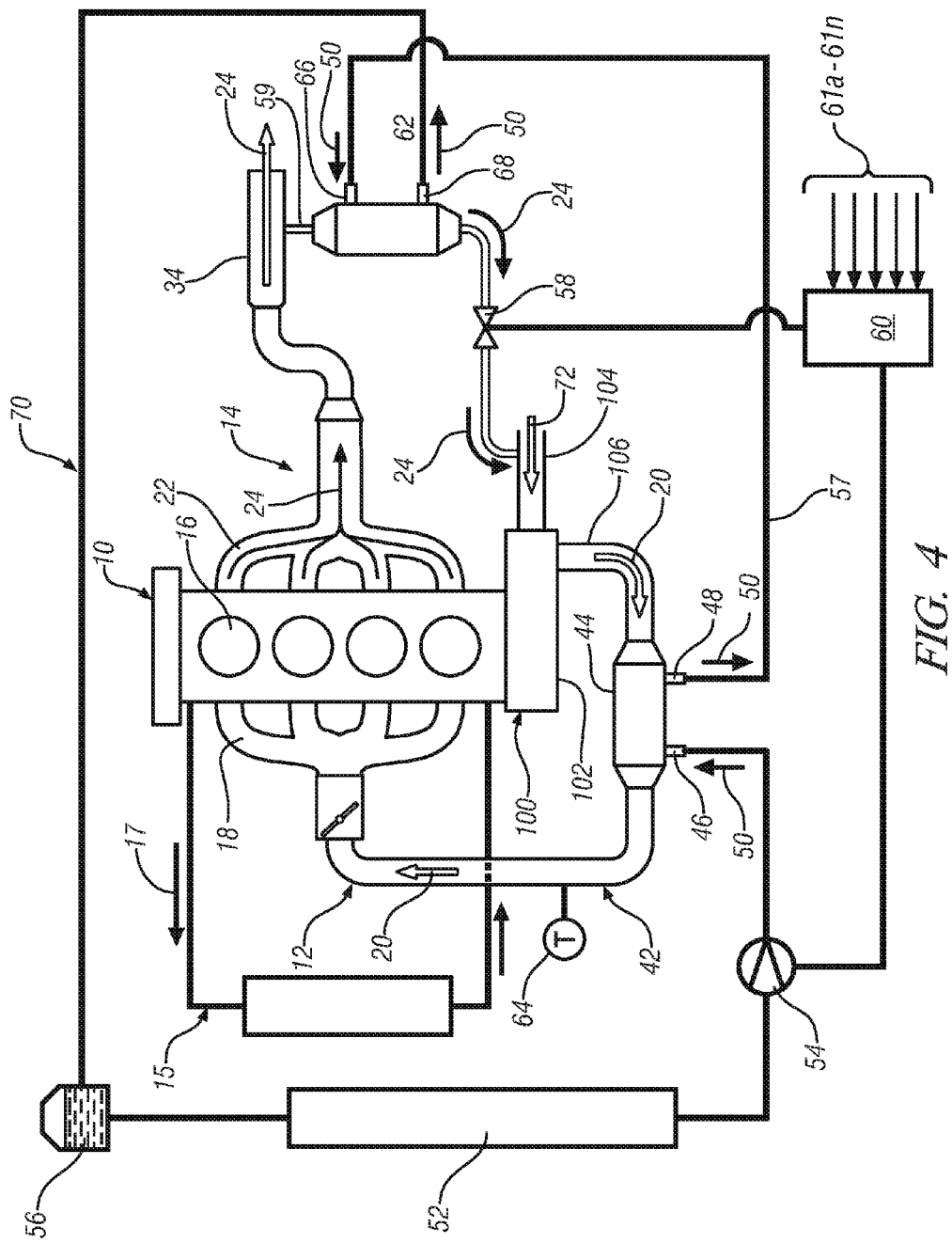
FIG. 4 is a schematic view of an internal combustion engine system comprising yet another embodiment the exhaust gas recirculation cooling system and the compressed intake charge cooling system of FIG. 1, embodying features of the present invention.

Referring now to FIG. 4, in an exemplary embodiment, the internal combustion engine 10 includes an intake manifold 18, in fluid communication with cylinders 16 that receive a compressed intake charge from a compressor in the intake system 12. The exhaust system 14 includes an exhaust manifold 22, also in fluid communication with the cylinders 16, which is configured to remove combusted constituents of the combustion air and fuel (i.e. exhaust gas 24) and to deliver it to an exhaust gas conduit 34. The exhaust gas conduit is in fluid communication with the remainder of the exhaust system 14 and delivers the exhaust gas 24 to various exhaust after treatment devices (not shown) that are configured to treat regulated constituents of the exhaust gas 24 prior to its release to the atmosphere.

The intake system 12 also includes an intake charge compressor or engine driven supercharger 100 having a housing 102 that includes an inlet 104 and an outlet 106. The outlet 106 is in fluid communication with the intake system 12 and delivers a compressed intake charge 20 through an intake charge conduit 42 to the intake manifold 18 for delivery to the cylinders 16 of the internal combustion engine 10 for mixture with fuel and for combustion therein. In an exemplary embodiment, disposed inline between the compressor housing outlet 106 and the intake manifold 18 is a compressed intake charge cooler 44. The compressed intake charge cooler 44 receives the heated (due to compression of the intake charge and addition of hot EGR) compressed intake charge 20 from the intake charge conduit 42 and, following cooling of the compressed intake charge 20 therein, delivers it to the intake manifold 18 through a subsequent portion of the intake charge conduit 42. The intake charge cooler 44 comprises an inlet 46 and an outlet 48 for the circulation of a cooling medium 50 (such as a typical glycol-based automotive coolant, or other suitable medium for effective heat transfer in a heat exchanger) therethrough and operates as already described herein.

Located in fluid communication with the exhaust gas conduit 34 of the exhaust system 12, is an exhaust gas recirculation ("EGR") conduit 59. The EGR conduit 59 is configured to divert a portion of the exhaust gas 24 from the exhaust gas conduit 34 and to return it to, or recirculated it to, the intake system 12 of the internal combustion engine 10 through the inlet 104 of the engine driven supercharger 100. An EGR valve 58 that is in signal communication with a control module such as controller 60 adjusts the volumetric quantity of exhaust gas 24 that is delivered to the intake system 12, based on the particular engine operating conditions at any given time. The engine controller 60 collects information regarding the operation of the internal combustion engine 10 from sensors 61a-61n, such as temperature (intake system, exhaust system, engine coolant, ambient, etc.), pressure, exhaust system conditions, driver demand as well as the temperature of the compressed intake charge supplied by temperature sensor 64 and, as a result, may adjust the flow of exhaust gas 24 through the EGR valve 58 and into the compressed intake charge 20. As a result the compressed intake charge 20 may comprise a continuously variable combination of fresh air 72 and recirculated exhaust gas 24, depending on the commanded degree of EGR flow by the controller 60.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An intake system for an internal combustion engine, the internal combustion engine including a primary cooling system, the intake system comprising:
   an intake charge compressor configured to deliver a compressed intake charge, comprising exhaust gas from an exhaust system and ambient air, through an intake charge conduit and to the internal combustion engine;
   a compressed intake charge cooler in fluid communication with the intake charge conduit and configured to receive, cool and transit the compressed intake charge therethrough;
   a secondary cooling system, independent of the primary cooling system, in fluid communication with the compressed intake charge cooler through a cooling system conduit having a cooling medium therein;
   a low temperature cooler in communication with the cooling medium and configured to receive the cooling medium through the cooling system conduit of the secondary cooling system;
   an exhaust gas conduit extending between the exhaust system of the internal combustion engine and an intake of the intake charge compressor for delivery of recirculated exhaust gas thereto; and
   an exhaust gas cooler in fluid communication with the exhaust gas conduit and configured to receive, cool and transit the recirculated exhaust gas therethrough, wherein the secondary cooling system is in fluid communication with the exhaust gas cooler through the cooling system conduit for delivery of the low temperature cooling medium from the secondary cooling system to, and through, the exhaust gas cooler.

2. The intake system for an internal combustion engine of claim 1, further comprising:
   an exhaust gas recirculation valve disposed in the exhaust gas conduit; and
   a controller in signal communication with the internal combustion engine and the exhaust gas recirculation valve and configured to vary the volumetric quantity of exhaust gas that is delivered to the intake charge compressor based on internal combustion engine operating conditions.

3. The intake system for an internal combustion engine of claim 1, further comprising:
   a controller in signal communication with the internal combustion engine and a coolant pump and configured to adjust the coolant pump to vary the flow of low temperature cooling medium through the secondary cooling system.

4. The intake system for an internal combustion engine of claim 3, wherein the flow of the coolant pump is varied based on the temperature of the compressed intake charge in the intake charge conduit.

5. The intake system for an internal combustion engine of claim 2, further comprising:
   an exhaust gas cooling medium conduit branch extending between the cooling system conduit and a coolant inlet of the exhaust gas cooler; and
   a valve member disposed in fluid communication with the secondary cooling system and configured to adjust the flow of cooling medium to the exhaust gas cooler.

6. The intake system for an internal combustion engine of claim 5, wherein the controller is in signal communication with the valve member and is configured to vary the flow of low temperature cooling medium through the exhaust gas cooler.

7. The intake system for an internal combustion engine of claim 2, further comprising:
   a valve member disposed between the cooling system conduit and a coolant inlet of the intake charge cooler and configured to adjust the flow of cooling medium to the intake charge cooler.

8. The intake system for an internal combustion engine of claim 7, wherein the controller is in signal communication with the valve member and is configured to vary the flow of low temperature cooling medium through the intake charge cooler.

9. The intake system for an internal combustion engine of claim 1, wherein the intake charge compressor is an exhaust driven turbocharger.

10. The intake system for an internal combustion engine of claim 1, wherein the intake charge compressor is an engine driven supercharger.

11. An intake system for an internal combustion engine, the internal combustion engine including a primary cooling system, the intake system comprising:
    an intake charge compressor configured to deliver a compressed intake charge, comprising exhaust gas from the exhaust system and ambient air, through an intake charge conduit and to the internal combustion engine;
    an exhaust gas conduit configured to receive recirculated exhaust gas from the internal combustion engine and deliver it to an intake of the intake charge compressor;
    an exhaust gas recirculation valve disposed in the exhaust gas conduit and configured to regulate the flow of exhaust gas to the intake of the intake charge compressor;
    an exhaust gas cooler in fluid communication with the exhaust gas conduit and configured to receive, cool and transit the recirculated exhaust gas therethrough;
    an intake charge cooler in fluid communication with the intake charge conduit and configured to receive, cool and transit the compressed intake charge therethrough;
    a secondary cooling system, independent of the primary cooling system in fluid communication with the intake charge cooler and the exhaust gas cooler through a cooling system conduit and having a low temperature cooling medium therein, wherein the secondary cooling system is in fluid communication with the exhaust gas cooler through the cooling system conduit for delivery of the cooling medium from the secondary cooling system to, and through, the exhaust gas cooler; and
    a low temperature cooler in communication with the low temperature cooling medium and configured to receive the cooling medium through the secondary cooling system.

12. The intake system for internal combustion engine of claim 11, further comprising:
    a controller in signal communication with the internal combustion engine and a coolant pump and configured to adjust the coolant pump to vary the flow of low temperature cooling medium through the secondary cooling system.

13. The intake system for an internal combustion engine of claim 12, further comprising:
    a valve member, in signal communication with the controller, disposed between the cooling system conduit and a coolant inlet of the intake charge cooler, the controller configured to adjust the valve member and the flow of cooling medium to the intake charge cooler.

14. The intake system for internal combustion engine of claim 12, further comprising:
a valve member, in signal communication with the controller, disposed between the cooling system conduit and a coolant inlet of the exhaust gas cooler, the controller configured to adjust the valve member and the flow of cooling medium to the exhaust gas cooler.

15. The intake system for an internal combustion engine of claim 11, wherein the intake charge compressor is an exhaust driven turbocharger.

16. The intake system for an internal combustion engine of claim 11, wherein the intake charge compressor is an engine driven supercharger.

* * * * *